Sept. 30, 1969  A. J. STERN ET AL  3,469,316
DOWEL POSITIONING MEANS

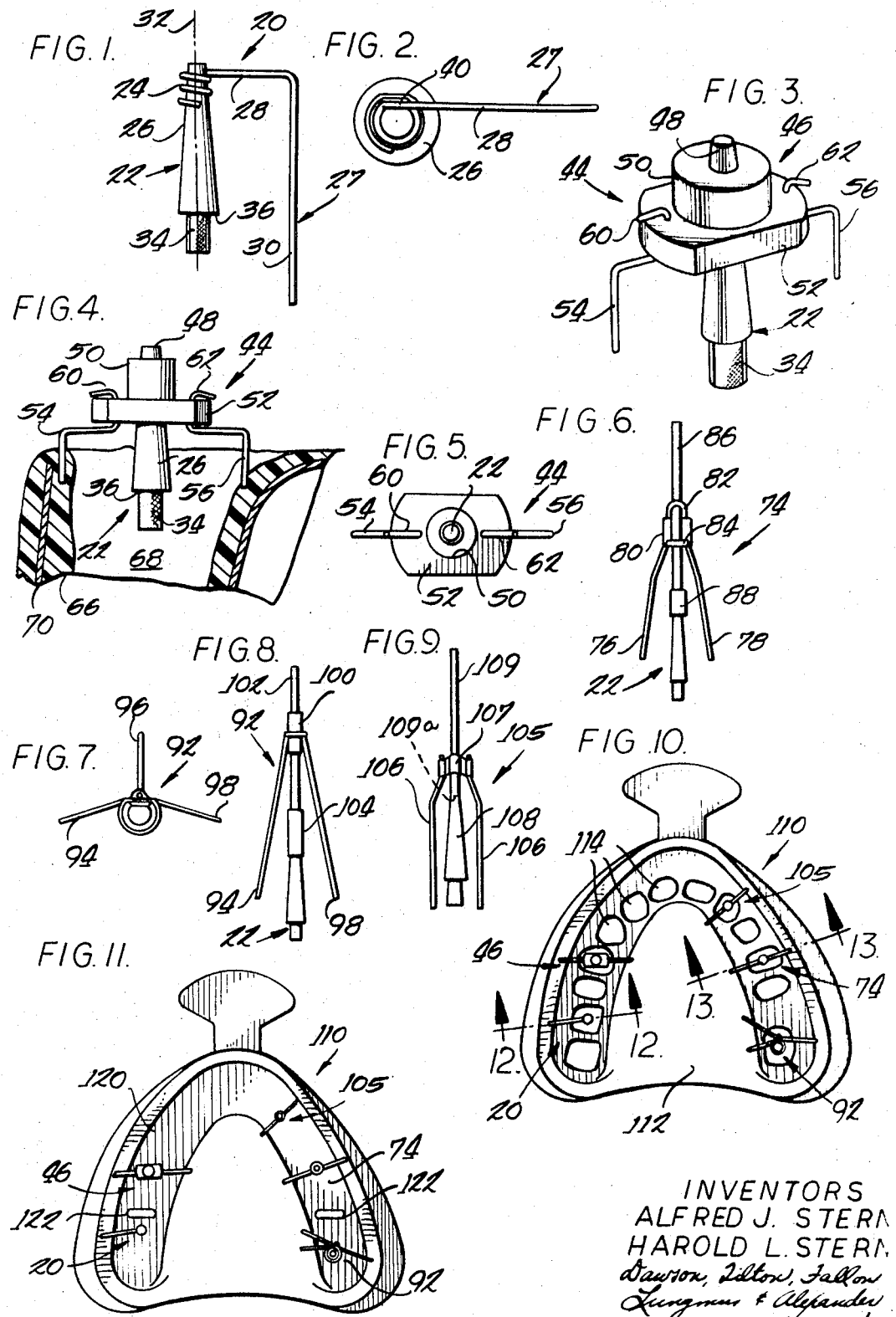

Filed Oct. 27, 1966  2 Sheets-Sheet 2

INVENTORS
ALFRED J. STERN
HAROLD L. STERN
Dawson, Tilton, Fallon
Jungmas & Alexander
ATTYS United States Patent Office 3,469,316
Patented Sept. 30, 1969

3,469,316
DOWEL POSITIONING MEANS
Alfred J. Stern, 5307 Valkeith St. 77035, and Harold
L. Stern, 6906 Van Etten St. 77021, both of Houston,
Tex.
Filed Oct. 27, 1966, Ser. No. 595,557
Int. Cl. A61c 9/00
U.S. Cl. 32—17                    8 Claims

ABSTRACT OF THE DISCLOSURE

A reusable dowel holder is provided for holding an elongated, tapered dowel in making a positive replica of a tooth from a negative impression of the tooth formed in an impression material. The dowel holder includes an elongated leg portion which is adapted to engage the impression material and extend generally upwardly therefrom. A holding portion extends from the upper end of the leg portion over the negative impression, and the holding portion is provided with a central opening for receiving and releasably gripping the tapered end of the dowel when the dowel is inserted into the opening in a direction generally opposite to the direction in which the leg extends away from the holding portion. After die material is poured into the negative impression about the lower end of the dowel and the die material sets, the dowel holder can be disengaged from the dowel by pulling the dowel holder upwardly away from the dowel to disengage the leg portion from the impression material.

This invention relates to a method and apparatus for preparing models of teeth for use in making bridges and abutments for partials or for any other purpose for which a removable or reinforced abutment is desirable.

It is a common practice in making a model of a patient's teeth to first form a negative impression of the teeth. Dowel or mounting pins are positioned in the center of negative impressions of particular teeth which are to be worked on. The negative impressions of the teeth are then filled with a die material to form a positive replica or die of the teeth. After the die material has cured or set, the model is completed by casting a base stone integrally with the die material to form a foundation for the replica of the teeth. A tooth which is to be worked on is separated from the model by cutting the die material with a saw or other means and lifting the tooth die, on its dowel or mounting pin, from the base stone. The dowel or mounting pin facilitates handling the tooth die and the repositioning of the tooth die back on the base stone.

The satisfactory results obtained by following the above method for fabricating models of teeth is shown by the widespread usage of the method by dentists and dental technicians. A major difficulty encountered in practicing the method lies in positioning the dowel or mounting pin in the center of the negative impression of the teeth which are to be worked on. If a longitudinal axis of the dowel is located at a substantial angle relative to a vertical axis of the tooth impression, the model may be ruined when the tooth die is separated from the base stone. If the dowel extends into an adjacent tooth, the removal of a selected tooth die is extremely difficulty, if not impossible. Also, if the dowel is positioned in an abutting relationship with the side walls of the impression, the die of the tooth is ruined by the projecting surface of the dowel. Therefore, it is essential that the dowel be maintained in a substantially vertical position in the center of the impression of the tooth, and if desired parallel to each other.

The most common prior art method of positioning a dowel in a tooth impression consists of manually inserting and holding the dowel in the impression of a tooth. In practicing this method of positioning a dowel, the negative impression of the tooth is first filled with a die material. The dowel is then inserted into the die material in the negative impression of a tooth and held while the die material sets or crystallizes. This method of positioning a dowel requires that the dowel be positioned by a skilled dental technician relative to the negative impression of a tooth after the impression has been filled with die material. Since the die material blocks the dental technician's vision of side surfaces of the negative impression of a tooth, it is almost impossible to accurately position a dowel relative to the negative impression of a tooth with the prior art method. In addition to requiring the blind placement of the dowel relative to the negative impression of a tooth, the manual inserting and holding of the dowel is extremely time consuming.

Another prior art solution to the problem of positioning a dowel in a tooth impression consists of using a jig to hold the dowel. The jig is usually attached to a dental impression trough or a separate stand and includes a plate member which overlies the negative tooth impression. A rod, to which the dowel is attached, is then suspended from the plate to center the dowel in the tooth impression. The vertical and lateral adjustment of a jig to position a dowel in a tooth impression is both difficult and time-consuming. The difficulties are greatly increased when several dowels are to be positioned by the same jig in several adjacent tooth impressions. Also, a large number of the relatively expensive jigs must be purchased and maintained by a dental laboratory which makes many models of teeth in the course of a day.

Therefore, it is an object of this invention to provide an inexpensive method and apparatus for quickly and easily positioning a dowel in a negative impression of a tooth.

Another object of this invention is to provide a method and apparatus for positioning and securely retaining a dowel in the center of an impression of a tooth while the impression is filled with die material to form a positive replica of the tooth.

Another object of this invention is to provide a mounting means for directly engaging the impression material adjacent to a negative impression of a tooth to position a dowel member in a central portion of the negative impression.

Another object of this invention is to provide a mounting means for positioning a dowel relative to a negative impression of a tooth while the negative impression is filled with a die material, the mounting means being subsequently reusable for positioning other dowels.

Another object of this invention is to provide a mounting means for positioning a dowel relative to a negative impression of a tooth, while the negative impression is filled with a die material, the mounting means being adapted for engagement with a dental surveyor or similar device to position a plurality of dowels in parallel relationship relative to each other.

These and other objects and features of the invention will become more apparent upon a reading of the following detailed description taken in connection with the accompanying drawings, wherein:

FIG. 1 is an enlarged elevational view of a dowel and a positioning means for locating the dowel relative to a negative impression of a tooth;

FIG. 2 is an enlarged plan view illustrating the relationship of the dowel and positioning means of FIG. 2;

FIG. 3 is an enlarged perspective view of a dowel and a second embodiment of the dowel positioning means wherein the dowel is retained by an elastomeric body section;

FIG. 4 is an enlarged elevational view illustrating the mounting of the dowel and dowel positioning means of FIG. 3 relative to a negative impression of a tooth;

FIG. 5 is a plan view illustrating the relationship of the dowel and positioning means of FIG. 3;

FIG. 6 is an enlarged elevational view of a third embodiment of the positioning means for locating a dowel at any desired depth relative to the negative impression of a tooth wherein the dowel is adjustably supported by a pair of leg members;

FIG. 7 is an elevational view of another embodiment of the dowel positioning means wherein a plurality of leg members are utilized for locating the dowel positioning means;

FIG. 8 is an elevational view of the dowel positioning means of FIG. 7 further illustrating the relationship between the dowel member and the dowel positioning means;

FIG. 9 is an elevational view of still another embodiment of the invention wherein a dowel member having an outwardly extending shank section is utilized with a dowel positioning means;

FIG. 10 is a plan view illustrating the locating of dowels by the positioning means of FIGS. 1, 3, 6, 7 and 9 relative to negative impressions of teeth formed in impression material in a dental tray;

FIG. 11 is a plan view of the dental tray of FIG. 10 with die material filling the negative impressions of the teeth;

Figure 16:
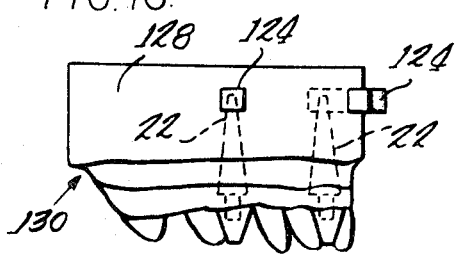
FIG. 16 is an elevational view of a model illustrating the relationship between a positive replica of the teeth, a base stone, the dowel members, and the channel forming members.
Figure 17:
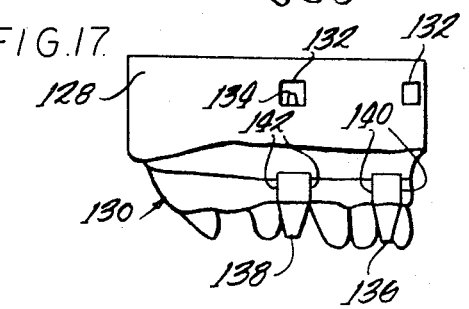
Figure 18:
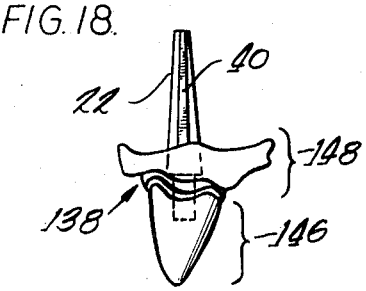

FIG. 17 is an elevational view of the model of FIG. 16 with the channel forming members removed from the base stone and the positive replicas of the teeth which are to be worked on being separated by saw cuts or other means from the positive replicas of the other teeth; and FIG. 18 is a perspective view of a positive replica of a tooth which is to be worked on illustrating the relationship between the replica and the dowel member.

Referring now to the drawings in greater detail, there is shown in FIG. 1 an elevational view of a first embodiment of a dowel positioning assembly 20 for retaining a dowel 22 in a predetermined position relative to a negative impression of a tooth. The dowel positioning assembly 20 includes a body section 24 which is formed of a coil of wire which resiliently grips an end portion of a conical base 26 of the dowel 22. A leg section 27 is integrally formed with the body section 24 of the dowel positioning assembly. The leg section 27 includes a generally horizontally extending section 28 which connects a vertically extending mounting section 30 to the body 24. The body section 24 is mounted coaxially with a longitudinally extending axis 32 of the dowel 22.

The dowel 22 is well known and includes a knurled shank 34 which extends from the conical base 26 and is separated therefrom by the radially outwardly extending shoulder or collar 36. The knurled shank 34 and a lower end portion of the conical base 26 are adapted to engage a positive replica of a tooth while an upper end portion of the conical base section 26 is adapted to position the positive replica of a tooth on a base stone. The conical base section 26, as is best seen in FIG. 2, has a flat key surface 40 which facilitates the positioning of the positive replica of a tooth in a socket in the base stone. It will be apparent to those skilled in the art that dowels having a shape substantially different from the exemplary dowel 22 can be used with the positioning assembly 20 and the positioning assemblies set forth in FIGS. 3 through 8.

Referring now to FIGS. 3 through 5, a second embodiment of the dowel positioning assembly is shown. The dowel positioning assembly 44 includes a body section 46 which is made of a suitable resilient elastomeric material for resiliently engaging an upper end portion 48 of the dowel 22. The body 46 includes a generally cylindrical upwardly extending central section 50 which is integrally formed with a radially outwardly extending base or flange 52. Leg members 54 and 56 are connected to opposite sides of the flange section 52. The leg members 54 and 56 are retained on the flange 52 by hook sections 60 and 62 which extend through the flange 52. The outwardly extending legs 54 and 56 are pivotal relative to the flange 52 to facilitate the engagement of the legs 54 and 56 with impression material in which a negative impression 68 of a tooth and the associated gum is formed. The impression material 66 can be any of the commercially available elastomeric impression materials, which are commonly formed of a silicone base rubber, mercaptan base rubber or hydrocolloid. The impression material 66 is molded in a dental impression tray 70 in the usual manner.

The conical base 26 of the dowel 22 is grippingly retained in the position shown in FIG. 4 to locate the knurled shank 34 of the dowel 22 in a position extending downwardly into the negative impression 68 of a tooth. The pivotal legs 54 and 56 enable the body 46 to be readily adjusted longitudinally relative to the negative impression 68. The body 46 is also movable vertically relative to the legs 54 and 56 to facilitate the vertical placement of the dowel 22 in the negative impression 68. This vertical and horizontal pivotal relationship between the body 46 and legs 54 and 56 results from the advantageous hooking engagement of the legs with the flange 52 of the body.

Referring now to FIG. 6, in which a third embodiment of the dowel positioning assembly is shown. The dowel positioning assembly 74 includes a pair of legs 76 and 78 which are secured to a body section 80. The body section 80 includes a pair of guide loops or eyes 82 and 84 through which a positioning rod or shaft 86 extends. The positioning rod 86, of the body section 80, has a dowel engaging retainer 88, formed of a metallic or polymeric material, which grips an upper end portion of the dowel 22. The rod 86, retainer 88 and dowel 22 are movable relative to the legs by sliding the rod 86 through the eyes 82 and 84. It will be apparent that the sliding engagement of the rod 86 with the eyes 82 and 84 enables the dowel 22 to be positioned vertically relative to a negative impression of a tooth. This vertical adjustment is particularly advantageous when the dowel positioning assembly 74 is used to locate a dowel relative to an impression of a narrow tooth. The outwardly extending rod 86 also facilitates paralleling one dowel 22 relative to another dowel 22 by attaching the rods 86 associated with the dowels 22 to a dental surveyor or similar device.

In FIGS. 7 and 8 another embodiment of the invention is shown. In these figures a dowel positioning assembly 92 is illustrated. The dowel positioning assembly 92 is somewhat similar to the dowel positioning assembly 74 shown in FIG. 6. However, the dowel positioning assembly 92 includes three leg sections 94, 96 and 98 which are connected to the central body 100 formed of a suitable metallic or polymeric material. The body 100 includes a rod 102 and dowel retainer 104 which are mounted for vertical sliding movement. It will be apparent, from a comparison of FIG. 6, and FIGS. 7 and 8 that the dowel positioning assembly 92 differs from the dowel positioning assembly 74 in the provision of three leg members for engaging the impression material to locate the dowel positioning assembly relative to a negative impression of a tool. The use of three leg members, rather than two, for locating the dowel positioning assembly 92 relative to the negative impression of a tooth increases the longitudinal stability of the dowel positioning assembly.

Still another embodiment of the invention is illustrated in FIG. 9 in which a dowel positioning assembly 105 is shown. The dowel positioning assembly 105 is generally similar to the dowel positioning assembly 74 of FIG. 6. The dowel positioning assembly 105 includes a pair of spaced apart leg sections 106 which are connected to a central body member 107. A dowel 108, formed of a metallic or polymeric material, includes an upwardly extending positioning shank or shaft section 109 which is grippingly engaged by the body 107. The positioning shank 109 is integrally formed with the body of the dowel 108 and can be moved inwardly and outwardly relative to the body 107 to change the vertical position of the dowel 108 relative to the negative impression of a tooth. The shank section 109 of the dowel 108 can be cut off where the shank sections joins the body of the dowel 108, indicated at 109a in FIG. 9, after the base of a model has been poured in a manner to be explained subsequently. It will be apparent to those skilled in the art that the outwardly extending positioning shank 109 enables the dowel 108 to be readily positioned by a dental surveyor or like instrument.

Referring now to FIG. 10, a dental impression tray 110 is illustrated. This tray is similar to the dental impresion tray 70 of FIG. 4. Impression material 112, similar to the impression material 66, is located in the dental impression tray. A plurality of negative cavities or impressions 114 of teeth are formed in the dental impression tray. The dowel positioning assemblies 20, 46, 74, 92 and 105 have been shown positioned adjacent the negative impression of teeth, and the associated gum, which are to be worked on. The dowel positioning assemblies 20, 46, 74, 92 and 105 each engage the negative impression of a gum portion associated with a tooth. The positioning assemblies retain dowel members 22 in a spaced apart relationship relative to the side walls of the negative impressions of the teeth. The negative impressions of the teeth are then filled with a die material 120, which may be of any commercially available die material such as "Bingle Die," as shown in FIG. 11. A pair of wire loops or screw eyes 122 are then mounted in the die material 120 to facilitate the connection of a positive replica of the teeth to a base stone.

Figure 12:
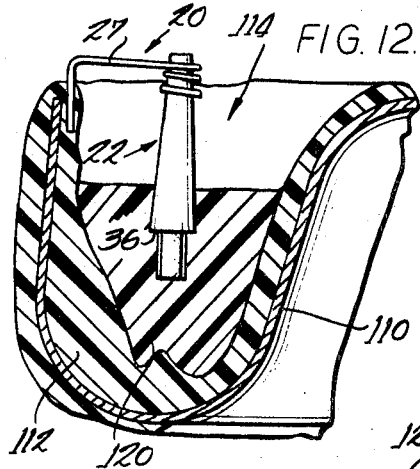
FIG. 12 is an enlarged sectional view, taken along the line 12—12 of FIG. 10, illustrating the relationship of the dowel positioning means of FIG. 1 and a dowel member to the negative impression of a tooth.
Figure 13:
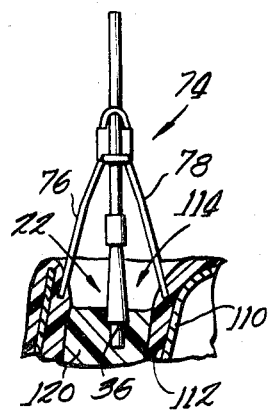
FIG. 13 is an enlarged sectional view, taken along the line 13—13 of FIG. 10, illustrating the relationship of the dowel positioning means of FIG. 6 and a dowel member relative to the negative impression of a tooth.

As is seen in FIGS. 12 and 13, the die material 120 fills the negative cavities 114 to a level above the radially outwardly extending shoulder 36 of the dowel 22. It should be noted that the leg section 27 of the dowel positioning assemblies are located above the upper level of the die material 120. Therefore, the leg section 27 of the dowel positioning assembly 20 engages the impression material 112, as shown in FIG. 12, adjacent the upper edge of the negative impression 114. Also, as illustrated in FIG. 13, the dowel positioning assembly 74 is mounted by the leg members 76 and 78 in a position above the upper level of the die material 120. The dowel positioning assemblies 46 and 92 are mounted in a similar location relative to the die material 120. By so locating the dowel positioning assemblies 20, 46, 74, 92 and 105, the dowel positioning assemblies may be disengaged from the dowels 22 and reused when making subsequent models of a patient's teeth. In addition, this placement of the dowel positioning assembly in direct engagement with the impression material enables the dowels 22 to be retained in a predetermined position without having the leg sections projecting through the surface of a positive replica of the teeth. Therefore, the dowels 22 can be quickly and easily positioned relative to a negative impression of a tooth by piercing an outer surface of the impression material with the leg sections.

Figure 15:
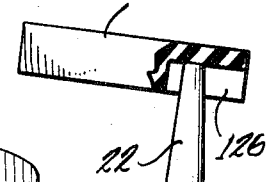
FIG. 15 is an enlarged view, taken along the line 15—15 of FIG. 14, illustrating the relationship of a channel forming member and the outwardly projecting end portion of a dowel member.
Figure 14:
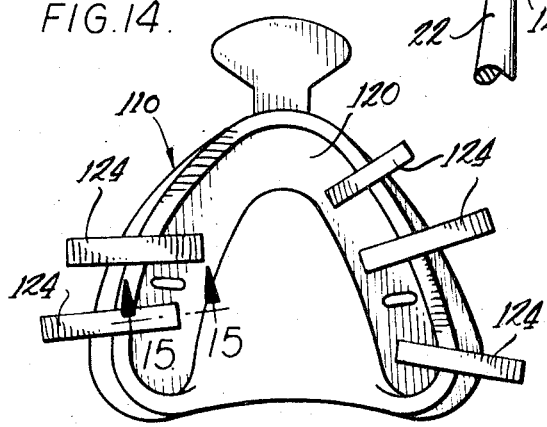
FIG. 14 is a plan view of the dental tray of FIG. 11 with the dowel positioning means removed and channel forming members placed in engagement with an outwardly projecting end portion of the dowel members.

After the die material has been cast and solidified in the negative impressions, as shown in FIG. 11, the dowel positioning assemblies 20, 46, 74, 92 and 105 are disengaged from the dowels and removed from the dental tray by withdrawing the leg sections from the impression material. After the dowel assemblies have been removed, channel forming members 124 are mounted in engagement with an upper end portion of the dowel members 22, as shown in FIGS. 14 and 15. The channel forming members 124 are made of a resilient elastomeric material and have a longitudinally extending slit 126 which receives an upper end portion of the dowel member 22. After the channel members 124 have been positioned, as shown in FIG. 14, a base stone 128 (see FIG. 16) of plaster of paris or other suitable material is integrally cast with the the positive replica 130 of a patient's teeth. The channel forming members 124 protrude radially outwardly of the stone base 128 where they may be readily grasped and disengaged from the downwardly protruding end portion of the dowels 22.

Referring now to FIG. 17, which illustrates the stone base 128 with the channel forming members 124 removed, it can be seen that channels 132 are formed to provide access to a lower end portion 134 of the dowels 22. Positive replicas 136 and 138 of teeth which are to be worked on are separated from the adjoining positive replicas by saw cuts, or other means, 140 and 142. The selected teeth 136 and 138 can then be removed from the base stone 128 by forcing the end portion 134 of the dowel members 22 upwardly.

Referring now to FIG. 18, it will be seen that the positive replica of the tooth 138 is mounted on a dowel 22 to facilitate the handling of the positive replica. With the positive replica of the tooth 138 separated from the other positive replicas of a patient's teeth, the positive replica 138 can be readily worked on to form crowns, inlays, and bridges for the crown portion 146 of the tooth. Also, the gum portion 148 of the positive replica of the tooth is readily accessible for dental work. As previously explained, the dowel 22 includes a flat key surface or surfaces 40 which facilitates the placement of the tooth back in the correct position in the base stone 128.

Method of operation

The manner in which the present invention may be practiced and the purpose to which it may be put are evident from the foregoing description. However, for purposes of affording a more complete understanding of the invention, it is advantageous now to provide a functional description of the mode in which the component parts thus far identified cooperate. When a model of a patient's teeth is to be fabricated, a negative impression of the teeth will be formed in a dental tray 110 in the impression material 112. Dowels 22 can then be positioned in negative impressions 114 of the teeth which are to be worked on. The dowels 22 will be retained in a spaced apart relationship relative to the side walls of the negative impression 114 by dowel positioning assemblies. The dowel positioning assemblies will be impaled in the impression material associated with the gum of a tooth to be worked on to retained the dowel 22 in a predetermined positioned relative to the impression 114. The negative impression of a patient's teeth will then be filled with a suitable die material to a level above a radially outwardly extending shoulder 36 of the dowel 22. It should be noted that the leg portions of the dowel assemblies will pierce the surface of the impression material at an area above an uppermost level of the die material 120. After the die material has solidified, the dowel positioning assembly will be disengaged from the upper end of the dowel and withdrawn from the impression material 112 and used for fabricating subsequent models of teeth. The leg sections of the dowel positioning assemblies do not engage the die material and will not, therefore, protrude through a surface of the positive replica of a tooth.

To heighten the understanding of the invention, four embodiments of the dowel positioning assembly have been illustrated. In the first embodiment, set forth in FIGS. 1 and 2, a resilient coil body section 24 is utilized to grippingly engage an upper end portion of the dowel 22. With the dowel positioning assembly 20, a single leg section 26 extends from the body section to mount a dowel 22 relative to a negative impression of a tooth. It should be noted that the single leg section 26 will permit the dowel 22 and dowel positioning assembly 20 to be pivoted relative to the negative impression of a tooth to facilitate the precise positioning of the dowel 22 relative to the negative impression.

The dowel positioning assembly 44, illustrated in FIGS. 3 to 5, has a body section 46 which is made of a resilient elastomeric material for grippingly engaging the dowel 22. A pair of radially outwardly extending legs 54 and 56 are pivotally connected to the body section 46 by a pair of hooks 60 and 62 on the inner ends of the legs 54 and 56. The legs 54 and 56 will pierce an outer surface of the impression material to mount the dowel positioning assembly 44 and dowel 22 relative to the negative impression of a tooth. The body can be pivoted both horizontally and vertically relative to the leg sections 54 and 56 to facilitate the positioning of the dowel 22 relative to the negative impression of a tooth. This horizontal and vertical pivoting movement is facilitated by the hook construction utilized to attach the legs to the body section 46.

The dowel positioning assembly 74 of FIGS. 6 and 13 includes a pair of radially outwardly extending legs 76 and 78 which pierce an outer surface of the impression material to mount the dowel positioning assembly 74 relative to a negative impresion of the tooth. The vertically extending rod member 86 is slidable relative to the body section 80 and leg sections 76 and 78 to facilitate the vertical placement of a dowel in a negative impression of a tooth. The radially outwardly projecting legs 76 and 78 engage opposite sides of the negative impression of a tooth and the associated gum to securely position the dowel 22 intermediate the side wall of the negative impression.

Another embodiment of the invention has been illustrated in FIGS. 7 and 8. In this embodiment of the invention, which is somewhat similar to that of FIG. 6, a plurality of radially outwardly extending leg mmebers are provided for piercing the impression material to mount the dowel positioning assembly 92 relative to a negative impression of a tooth. Although only three legs have been illustrated in FIGS. 7 and 8, it will be apparent to those skilled in the art that any desired number of leg sections could be used. The dowel positioning assembly 92 includes a vertically adjustable rod member 102 for positioning the dowel 22 in a desired vertical location relative to the negative impression of a tooth.

Still another embodiment of the invention has been illustrated in FIG. 9. While this embodiment is similar to the embodiment of FIG. 6, the dowel 108 of FIG. 9 includes an outwardly extending positioning shank section 109 which is clampingly engaged by the body section 107. After the dowel 108 has been positioned relative to the negative impression of a tooth, and retained there by the legs 106 while the die material 120 is poured and solidified, the shank section 109 can be cut or otherwise separated from the body of the dowel 108 at the joint 109a between the body of the dowel and the positioning shank 109. As will be apparent to those skilled in the art, the dowel 108 with the positioning shank 109 can also be used with the dowel positioning assemblies of FIGS. 1, 3, 6, and 7. Of course, the shape of the body section of a dowel 108 can be modified in any desired manner.

In view of the foregoing remarks, it will be apparent that the disclosed dowel positioning assemblies enable a dowel to be positioned in a predetermined location relative to both the negative impression of a tooth and to other dowels. The positioning of the dowel relative to the negative impression of a tooth is accomplished by means of leg sections which are impaled in the impression material. The leg sections pierce an outer surface of the impression material at an area which is substantially above the highest level of the die material, so that the dowel positioning assembly can be readily disengaged from the dowel and removed from the dental tray for reuse in making other dental models. In addition, the dowel positioning assemblies do not mar the exterior surface of a positive replica of a tooth.

What is claimed is:

1. Dental apparatus for use when making a positive replica of a tooth from a negative impression of a tooth formed in an impression material comprising: mounting means for supporting a dowel member in a spaced apart position relative to the negative impression of a tooth, said mounting means including leg means for engaging the impression material and a body means for grippingly engaging the dowel member and positioning the dowel member with an end portion of the dowel member extending into the negative impression of a tooth, said body means including coil means for resiliently gripping the dowel member.

2. The apparatus of claim 1 in which said leg means includes an outwardly extending leg member integrally formed with said coil means.

3. A reusable dowel holder for holding an elongated tapered dowel when making a positive replica of a tooth from a negative impression of a tooth formed in impression material into which die material is poured, the dowel holder including an elongated leg portion for engaging the impression material and adapted to extend generally upwardly from the impression material generally longitudinally with respect to the dowel, and a holding portion extending from said leg portion over the negative impression, said holding portion being provided with a central opening for receiving and releasably gripping the tapered end of the dowel when the dowel is inserted into the opening in a direction generally opposite to the direction in which the leg portion extends away from the holding portion whereby said leg portion can be inserted into said impression material to position the dowel within the negative impression and the dowel holder can be disengaged from the dowel after the die material is poured by pulling the dowel holder upwardly away from the negative impression.

4. The dowel holder of claim 3 in which said holding portion includes a resilient generally cylindrical central portion, said central opening extending generally axially through said central portion, and a flange extending radially outwardly from the central portion, said leg portion being attached to said flange.

5. The dowel holder of claim 4, said leg portion being provided by a pair of legs, each leg including a hook portion rotatably attached to the flange, said legs being attached to the flange on opposite sides of the cylindrical portion.

6. The dowel holder of claim 3 in which said holding portion includes a body portion and a positioning rod slidably secured to said body portion, said central opening being provided in one end of said positioning rod, said leg portion being provided by a pair of legs extending from said body portion.

7. The dowel holder of claim 6 in which said body portion includes a pair of aligned guide loops, said positioning rod being slidably received by said loops.

8. The dowel holder of claim 3 in which said holding portion includes coil means for resiliently gripping the dowel.

References Cited

UNITED STATES PATENTS

| | | | |
|---|---|---|---|
| 2,337,036 | 12/1943 | Erdle | 18—47 |
| 2,851,728 | 9/1958 | Spalten et al. | 18—34.1 |
| 3,255,992 | 6/1966 | Kersten | 249—205 |

ROBERT PESHOCK, Primary Examiner

U.S. Cl. X.R.

32—40; 249—54